United States Patent [19]

Kaufmann et al.

[11] Patent Number: 4,812,635
[45] Date of Patent: Mar. 14, 1989

[54] OPTOELECTRONIC DISPLACEMENT SENSOR WITH CORRECTION FILTER

[75] Inventors: Meinolph Kaufmann, Baden; Karl Klöti, Fislisbach; Jürgen Nehring, Wettingen; Hanspeter Schad, Rieden, Switzerland

[73] Assignee: BBC Brown Boveri AG, Baden, Switzerland

[21] Appl. No.: 90,097

[22] Filed: Aug. 27, 1987

[30] Foreign Application Priority Data

Sep. 5, 1986 [CH] Switzerland ............ 3578/86

[51] Int. Cl.⁴ ............................................. G01D 5/34
[52] U.S. Cl. ............................ 250/231 R; 250/211 K; 250/205; 350/314
[58] Field of Search ............... 250/211 K, 229, 231 P, 250/231 R, 204, 205; 23/705; 340/365 P; 350/314, 315; 356/373, 389

[56] References Cited

U.S. PATENT DOCUMENTS

| | | | |
|---|---|---|---|
| 3,676,129 | 7/1972 | Ragland, Jr. ............... | 350/314 |
| 3,857,032 | 12/1974 | Van Englehoven .......... | 250/229 |
| 3,892,961 | 7/1975 | Bachmann .................. | 250/211 K |
| 4,109,147 | 8/1978 | Heske ....................... | 250/231 P |
| 4,273,526 | 6/1981 | Perrelli ..................... | 250/231 P |
| 4,275,505 | 6/1981 | Delmas ..................... | 250/231 R |
| 4,564,893 | 1/1986 | Myrman .................... | 350/314 |

FOREIGN PATENT DOCUMENTS

60-177216(A) 9/1985 Japan.
61-148308(A) 7/1986 Japan.

Primary Examiner—David C. Nelms
Assistant Examiner—Michael Messinger
Attorney, Agent, or Firm—Oblon, Fisher, Spivak, McClelland & Maier

[57] ABSTRACT

An optoelectronic displacement sensor for the absolute measurement of displacement in the sub-micrometer range is described, which is constructed, according to an exemplary embodiment, with a light-emitting diode (L) as light source and two photodiodes (D1, D2), which are arranged in a difference circuit and which are opposite to one another, as radiation sensors. The sensing of displacement takes place by means of a diaphragm (2), which is displaceable between light source and radiation sensors and which influences the illumination received by of the photodiodes (D1, D2). For the homogenization of the illumination, special means are provided, which, according to an exemplary embodiment, consist of a correction filter (6) disposed in the beam path.

11 Claims, 7 Drawing Sheets

OPTOELECTRONIC DISPLACEMENT SENSOR WITH CORRECTION FILTER

TECHNICAL FIELD

The invention relates to an optoelectronic displacement sensor. It relates specifically to an optoelectronic displacement sensor for the absolute measurement of displacement in the sub-micrometer range, in particular for the positioning of optical waveguides.

PRIOR ART

For the construction of sensitive and accurate displacement sensors, a series of different measurement principles are in current use, which operate in some cases electronically, in some cases optically or optoelectronically.

Conventional non-optical sensor systems for the absolute measurement of displacement in the sub-micrometer range operate, for example, resistively (resistance wire strain gauge), inductively (differential transformers) or capacitively (differential capacitors). As far as the required electronics is concerned, these known systems are very costly.

Optical sensors by means of which lengths can be resolved directly, such as, for example, a lateral diode or a PSD (Position Sensitive Detector), are indeed simpler in terms of the signal processing, but are in some cases nonlinear and require a special point light source.

On the other hand, it is known, in the field of positioning control, to employ for the purposes of position regulation a sensor system in which a moveable, motor-driven aperture diaphragm is provided between a light source and two photodiodes disposed in a difference circuit, which aperture diaphragm is displaced by means of a regulating circuit until such time as the output signals of the photodiodes are exactly equal (Elektronik (Electronics), No. 11, May 1986, p. 108).

However, this positioning control is not suitable for an absolute measurement of displacement, but only designed for the purpose of assuring the setting of an unambiguous position.

Especially for the reproduceable and displacement-regulated coupling-in of light into optical waveguides, specifically in the case of the so-called monomode fibers with a core diameter smaller than 10 μm, an absolute predetermination of the positioning in the range of 1/10 μm is required, which is at the same time thermally and mechanically stable. A solution of these coupling-in problems with conventional displacement sensor systems is, however, mechanically and electronically very costly.

Description of the Invention

The object of the invention is to provide an optoelectronic displacement sensor which, with high precision and sensitivity, at the same time can be constructed in a simple manner and is mechanically and thermally stable.

With an optoelectronic displacement sensor of the initially mentioned type, the object is fulfilled by the following features, namely by:
  at least one light source,
  opposite the light source at least two flat, thermally coupled, optoelectronic radiation sensors disposed beside one another,
  an evaluating electronic system connected behind the radiation sensors,
  a diaphragm disposed between the light source and the radiation sensors, in which arrangement
  the diaphragm is displaceable parallel to the radiation sensors, and in which arrangement
  the diaphragm is designed so that, in the case of a displacement of the diaphragm, the illuminated surface at least of one of the radiation sensors is varied, and
  means which assure a homogeneous illumination of the radiation sensors.

In this solution according to the invention, in some instances elements which are similar to those in the known positioning control are indeed present. However, the decisive difference consists in that in this instance particular measures are necessary because of the different category, i.e. because of the measurement of displacement, which is not undertaken at all in the case of the known positioning control.

These particular measures comprise, in particular, means which assure a homogeneous illumination of the radiation sensors.

According to a first exemplary embodiment, the means for homogeneous illumination consist of a correction filter, which is disposed between the single light source and the radiation sensors and the transmission of which varies over the filter surface so that the inhomogeneities in the intensity distribution of the light source are specifically eliminated.

In this case, the correction filter is preferably a film negative exposed with the light source at the corresponding spacing.

According to a second exemplary embodiment, at least two light-emitting diodes operating as light sources are provided as means for homogeneous illumination, which light-emitting diodes are disposed one behind the other in the direction of the axis of displacement of the diaphragm.

Light-emitting diodes emitting in the infrared are preferably employed as light sources, and corresponding infrared-sensitive photodiodes (Si-PIN diodes) are preferably employed as radiation sensors.

Possible fluctuations in brightness of the light-emitting diodes in the event of a variation of temperature are preferably controlled in that, in addition to the photodiodes, at least one reference photodiode is provided, which is fully illuminated by the light-emitting diodes in each position of the diaphragm, and the output signal of the reference photodiode is fed to a regulating circuit, which delivers a regulated current through the light-emitting diodes.

By the arrangement on a common substrate of good thermal conductivity, in particular in the form of monolithically integrated multiple photodiodes, it is achieved that all photodiodes are at the same temperature. The reference photodiode then balances all brightness fluctuations and compensates their temperature variation, since it is at the same temperature as the other photodiodes.

These and further exemplary embodiments form the subject of the subclaims.

BRIEF DESCRIPTION OF THE DRAWINGS

The invention is described and explained in greater detail hereinbelow, with reference to exemplary embodiments, in conjunction with the drawing. In the drawing.

Modes of implementation of the invention

Figure 1:
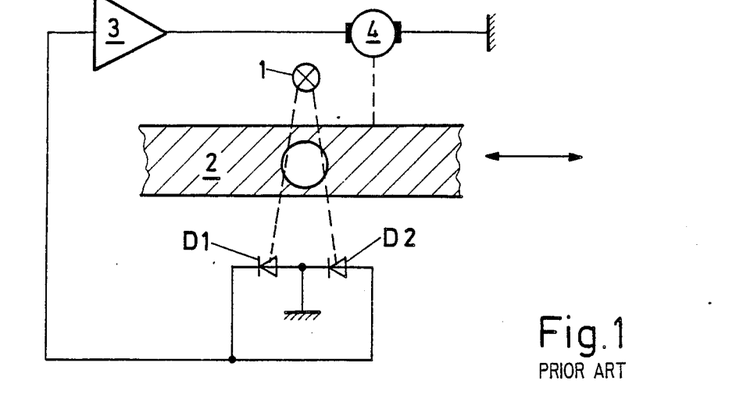
FIG. 1 shows the basic construction of a known positioning control.

FIG. 1 reproduces the basic construction of an optoelectronic positioning control as is known from the initially cited publication.

A light source 1 (not designated in greater detail) irradiates, through the aperture of a displaceable diaphragm 2, two photodiodes D1 and D2 disposed in a difference circuit. The difference signal of these photodiodes D1, D2 is applied to the input of a power amplifier 3, which drives an actuator motor 4, which on its part causes the displacement of the diaphragm 2.

This regulating circuit brings the diaphragm 1 into such a position that the photodiodes D1 and D2 are equally illuminated, i.e. the difference signal becomes zero. In this connection, therefore, what matters is simply that this end position is unambiguously determined and the output signal of the difference circuit for differing positions is sufficiently large to be able to drive the actuator motor 4. In this case, a measurement of displacement is not necessary and present.

Figure 2:
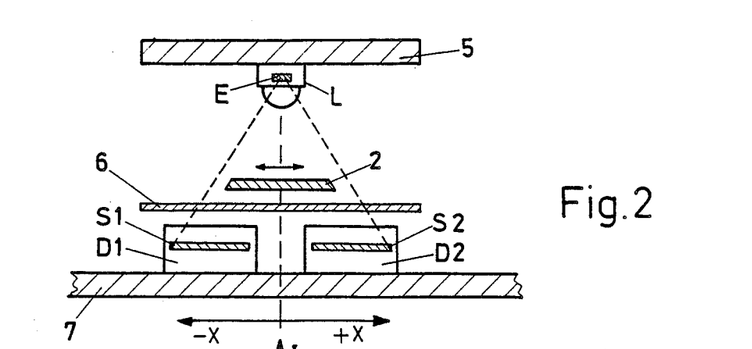
FIG. 2 shows the basic construction of an optoelectronic displacement sensor according to a first exemplary embodiment of the invention.

On the other hand, the situation is entirely different in the case of a first exemplary embodiment of the invention, the basic construction of which embodiment is represented in FIG. 2: A light-emitting diode L (with integrated lens) is disposed on an emitter substrate 5, e.g. a stable ceramic substrate. Opposite the light-emitting diode L, two photodiodes D1 and D2 are fitted side by side on an appropriate receiver substrate 7 of good thermal conductivity. The sensor surfaces S1 and S2 of the photodides D1 and D2 are situated within the radiation cone which proceeds out from the emitter surface E of the light-emitting diode L.

Between the light-emitting diode L and the photodiodes D1, D2 there is disposed a diaphragm 2, which is displaceable parallel to the sensor surfaces S1, S2 and which, in terms of its size, is dimensioned so that it always shades off only parts of the sensor surfaces S1, S2 and, in the event of a displacement, reduces the shading-off of one of the surfaces and at the same time increases the shading-off of the other surface.

Figures 3A, 3B, 3C:
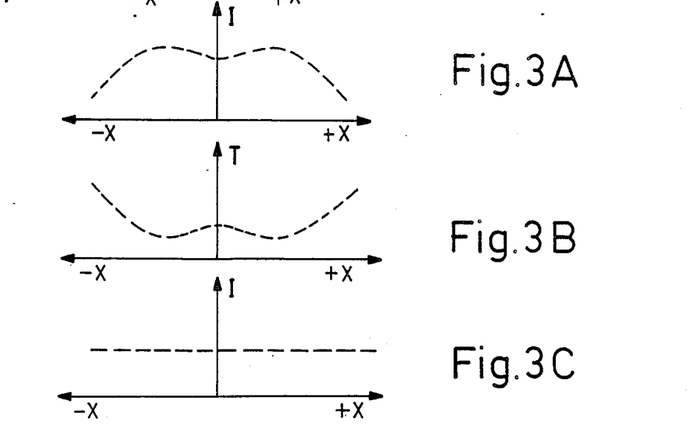
FIG. 3A shows schematically the inhomogeneous intensity distribution of a light-emitting diode according to FIG. 2.
FIG. 3B shows the transmission of a correction filter for the homogenization of the intensity distribution according to FIG. 3A.
FIG. 3C shows the homogenized intensity distribution due to the use of the correction filter.

Furthermore, a correction filter 6 is disposed (in the case of FIG. 2 between diaphragm 2 and photodiodes D1, D2) between the light-emitting diode L and the photodiodes D1, D2. This correction filter 6 is designed, in its attenuation or filter function, so that a homogeneous intensity distribution is formed behind the filter (FIG. 3C) from the originally inhomogeneous intensity distribution in the radiation cone in front of the filter (FIG. 3A). This is achieved by a transmission T, which is space-dependent in the correction filter 6 and which is approximately inversely proportional to the intensity distribution in the cone (FIG. 3B). The space coordinates $+x$ and $-x$ in FIGS. 3A-C correspond to those entered in FIG. 2.

A suitable correction filter 6 can be produced in various ways:

In a device according to FIG. 2 (however, without the diaphragm) in place of the correction filter 6 a piece of an infrared-sensitive film is mounted (if the light source is a light-emitting diode emitting in the infrared) and exposed. By appropriate selection of the negative film and of the development technique, it is possible to achieve a blackening of the film which is proportional to the irradiation intensity, which film can then be employed as correction filter.

If the intensity distribution of the light source is known, the desired absorption profile can be produced with the aid of an electronically controlled light source on a suitable photographic film by computer.

A plastic injection molding machine produces, from easily IR-absorbing material, a small filter plate matched in thickness to the intensity distribution.

These three production methods, the first one of which is at the same time preferred because of its simplicity, represent only selected examples of a multiplicity of possible processes.

In the displacement sensor arrangement according to FIG. 2, a light-emitting diode L with integrated lens is shown. Such a light-emitting diode based on GaAs is commercially available, for example, under the type designation BN 501 from the company Stanley. Planar Si photodiodes of the BPX 90 K type enter, for example, into consideration as photodiodes D1 and D2.

Figure 4:
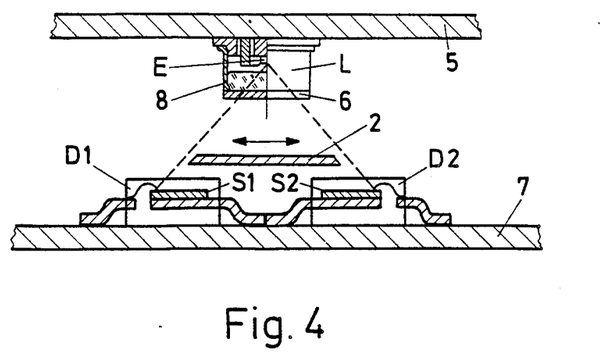
FIG. 4 shows a variant of the exemplary embodiment of FIG. 2.

Another possibility of the arrangement of the correction filter 6 is reproduced in the displacement sensor of FIG. 4. In this case, a light-emitting diode L is inserted in the metal housing with a planar glass window 8. Such a light-emitting diode is available in the trade, for example, under the type designation HE 8801 from the company Hitachi.

Where such a hermetically sealed, infrared-emitting LED is employed, the IR film for the correction filter 6 (e.g. a Kodak film HJE 2481) can be exposed in contact with the glass window 8. After development, the appropriate small filter disk is then stamped out and cemented onto the LED under the microscope by means of a UV-hardenable, transparent adhesive (e.g. Vitralit 7105 from the company 3M).

In this manner, a homogeneous light source is provided, which can be electrooptically measured, i.e. can be examined, before its incorporation, with regard to the homogeneity of its surface illumination.

Figure 5:
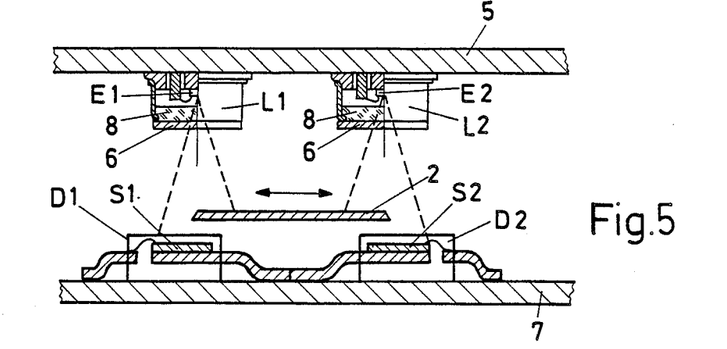
FIG. 5 shows a variant altered as compared with FIG. 4, with a broadened measurement range.

The usable measurement range of an optoelectronic displacement sensor according to FIG. 2 or 4 is limited by the radiation cone of the one light-emitting diode L. In order to obtain a displacement sensor with an expanded measurement range, several light-emitting diodes L1, L2 can be disposed one behind the other, as shown in FIG. 5, in the direction of the axis of displacement of the diaphragm 2. In this manner, an extended range of homogeneous illumination is provided, it being possible for the correction filter 6 either to be fitted again directly on the glass windows 8 of the light-emitting diodes L1, L2 (FIG. 5) or, corresponding to FIG. 2, to be disposed separately from the light-emitting diodes.

In the represented examples based on FIGS. 2, 4 and 5, the diaphragm 2 is shown only schematically in each instance. It is self-evident that by means of the moveable diaphragm 2 it is specifically the displacement to be measured which is coupled into the displacement sensor, that is to say that the diaphragm 2 is connected in a suitable manner to that object, the displacement executed by which is to be measured.

Figure 6:
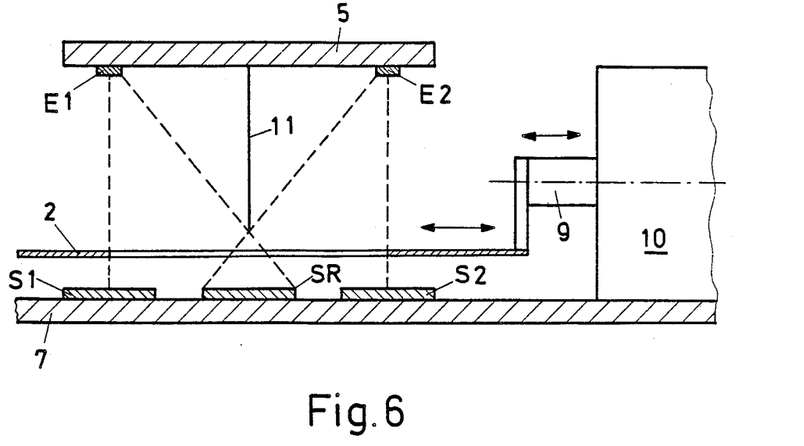
FIG. 6 shows the basic construction of an optoelectronic displacement sensor according to a second exemplary embodiment of the invention.

This becomes clear with reference to the schematized construction of the displacement sensor in FIG. 6, in which only the emitter surfaces E1, E2 of the light-emitting diodes and the sensor surfaces S1, S2 and SR of the photodiodes and of a reference photodiode respectively are shown. The diaphragm 2, which, in contrast to the examples derived from FIGS. 2, 4 and 5, and in a similar way to what is applicable in the positioning control derived from FIG. 1, has its aperture in the core region of the radiation cone, is in this case connected to the thrust rod 9 of a, for example, electromagnetically operating actuator 10, which (not shown in the figure) displaces the optical waveguide. The displacement distance can then be determined with reference to the position of the diaphragm 2.

While in the exemplary embodiments of FIGS. 2, 4 and 5 the described correction filters 6 are provided as means for homogenizing the illumination, in the exemplary embodiment of FIG. 6 the homogenization is achieved only by combination of two radiation cones, which proceed out from the two emitter surfaces E1 and E2. The relative position of the emitter surfaces E1, E2 to one another is, in this case, determined in a simple manner in accordance with the known radiation field of an individual emitter surface or light-emitting diode.

By way of a particular feature, in the case of the example derived from FIG. 6 a reference photodiode is disposed on the receiver substrate between the two photodiodes. The sensor surface SR of this reference photodiode is illuminated by each light-emitting diode in each position of the diaphragm 2, so that the photocurrent emitted by it can be used directly for the supervision and regulation of the light-emitting diodes.

By this means, in addition to the difference formation at the photodiodes, a further measure for the stabilization of the measuring device is permitted, in that brightness fluctuations and the ageing of the IR diode can be stabilized via the current supply of the light-emitting diodes. An appropriate evaluating and regulating electronic system is reproduced in FIGS. 8A and 8B and will be explained hereinafter.

In the case of the type of diaphragm 2 shown in FIG. 6, in order to prevent an overlapping of the radiation cones in the region of the sensor surfaces S1 and S2, a vertically set separating diaphragm 11 is provided in the center between the emitter surfaces E1, E2, which separating diaphragm does indeed shade off the respective sensor surface S1 or S2 towards the opposite emitter surface E2 or E1, but leaves unaffected the illumination of the sensor surface SR.

In the exemplary embodiment of FIG. 6, only one reference photodiode (sensor surface SR) is employed for two light-emitting diodes (emitter surfaces E1, E2). This makes the stabilization of brightness fluctuations which arise only in one of the two light-emitting diodes more difficult. It is therefore advantageous to associate with each one of the light-emitting diodes its own reference photodiode, so that for each light-emitting diode a specifically associated, independent regulating circuit is formed.

The various partial elevations of such a displacement sensor arrangement are represented in FIGS. 7A-7D. In this instance (FIG. 7A) a total of four photodiodes D1, D2 and reference photodiodes DR1, DR2 are disposed in pairs on the receiver substrate 7 provided with conductor strips 12; in this arrangement, a photodiode and a reference photodiode form a pair in each instance (D1, DR1 and D2, DR2 respectively).

Figure 7A:
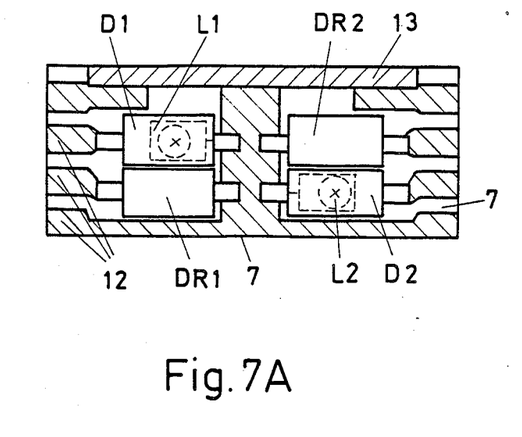
FIGS. 7A-D show various partial elevations of a variant of the exemplary embodiment according to FIG. 6.
Figure 7B:
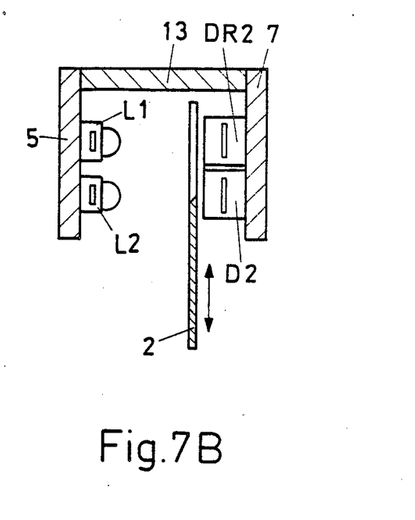
Figure 7C:
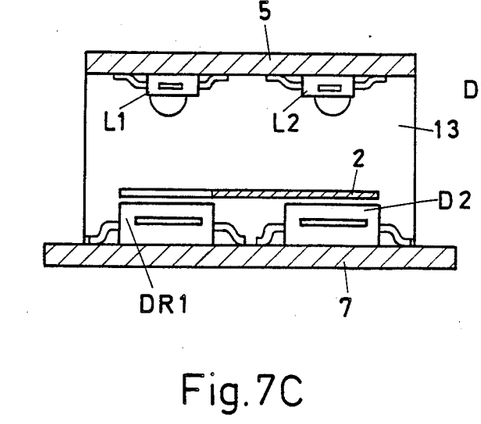

In one pair, the sequence of photodiode and reference photodiode is exchanged in relation to the other pair, so that both the photodiodes D1, D2 and also the reference photodiodes DR1, DR2 are arranged in a cross configuration.

On the emitter substrate 5 which is opposite the receiver substrate 7 and which is connected to the latter by a connecting wall 13 there are fitted two light-emitting diodes L1 and L2 respectively, the center of which coincides exactly with the center of the associated photodiode D1 or D2 (indicated in broken lines in FIG. 7A).

Figure 7D:
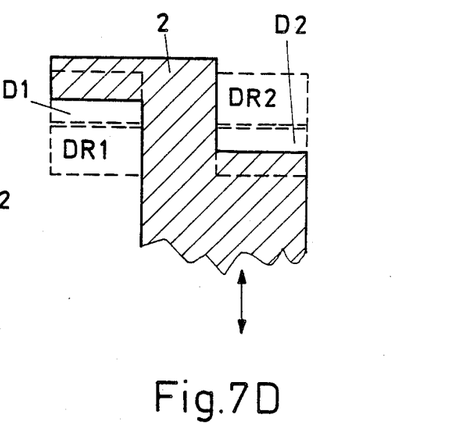

The diaphragm 2 displaceably disposed between the light-emitting diodes L1, L2 and the photodiodes D1, D2 has the form represented in FIG. 7D: while the reference photodiodes DR1, DR2 are fully illuminated by the associated light-emitting diodes L1, L2 in each diaphragm position, the photodiodes D1 and D2 are partly shaded off by the diaphragm 2 in such a manner that a displacement of the diaphragm 2 increases the shading-off in the case of one photodiode and on the other hand at the same time reduces it in the case of the other one.

For the homogenization of the illumination, in this case also, a correction filter (not shown) is again provided, which can either be fitted directly onto the light-emitting diodes or be inserted into the beam path in some other way.

Figure 8A:
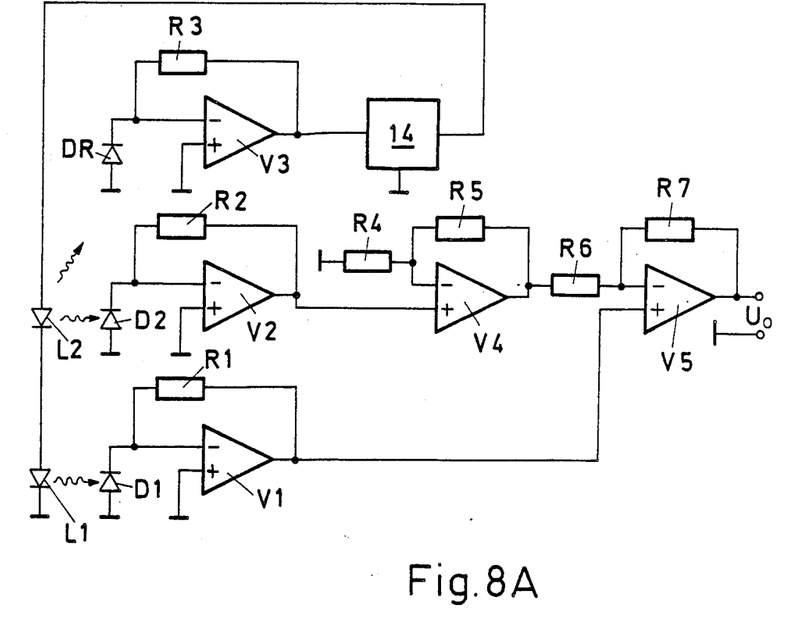
FIG. 8A shows a preferred exemplary embodiment of an evaluating electronic system with a regulating part for a displacement sensor according to FIG. 6.
Figure 8B:
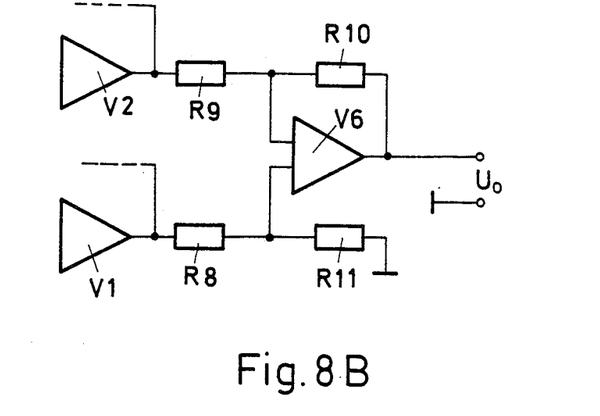
FIG. 8B shows a variant of the evaluating electronic system according to FIG. 8A, with a modified differential amplifier circuit.

With regard to the evaluating and regulating electronic system for a displacement sensor arrangement according to FIG. 6, two exemplary embodiments are reproduced in FIGS. 8A and 8B. The photodiodes D1 and D2 as well as the reference photodiode DR, the sensor surfaces S1, S2 and SR of which are shown in FIG. 6, form, in each instance together with appropriate feedback resistors R1, R2 and R3 and operational amplifiers V1, V2 and V3, voltage sources driven by the photocurrent.

The output signals of the operational amplifiers V1 and V2 are fed, for difference formation, to a differential amplifier circuit with high input impedance, which consists of the operational amplifiers V4, V5 and the resistors R4 ... R7. The output voltage $U_o$ present at the output of the operational amplifier V5 is then directly proportional to the displacement distance 1 of the diaphragm 2, measured from its symmetrical center position (FIG. 9).

The output signal of the operational amplifier V3 is fed to a regulating circuit 14, which, on its part, supplies the light-emitting diodes L1 and L2 with current. The detailed description of the regulating circuit 14 will be dispensed with at this point, because a person skilled in the art will indeed be familiar with this.

The circuit, known per se, having only one operational amplifier V6 and the resistors R8 ... R11 according to FIG. 8B can, of course, also take the place of the differential amplifier circuit derived from FIG. 8A with the two operational amplifiers V4 and V5.

Figure 9:
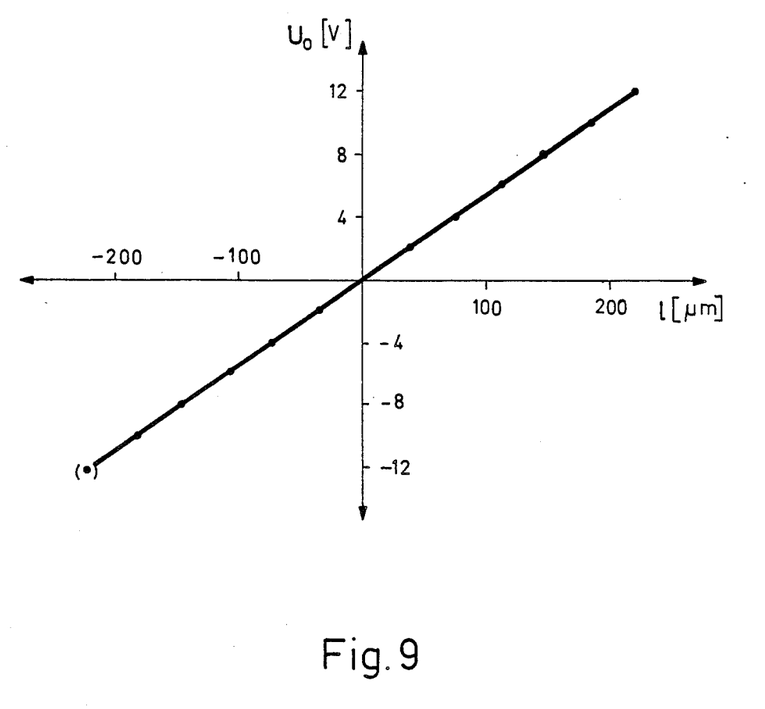
FIG. 9 shows a measurement curve for a displacement sensor according to FIGS. 6 and 8A, FIGS. 10A, B show an exemplary embodiment for a displacement sensor according to the invention, with radiation sensors in the form of a monolithically integrated double photodiode (side elevation and plan view)

Finally, the measured characteristic of an arrangement according to FIG. 6 with an evaluating electronic system according to FIG. 8A is reproduced in FIG. 9, as a function of the output voltage $U_o$ against the displacement 1 of the diaphragm 2. It is possible to see the excellent linearity and the high sensitivity in the case of this exemplary embodiment of an optoelectronic displacement sensor according to the invention.

A further exemplary embodiment for the displacement sensor according to the application, which embodiment is distinguished by a particularly compact construction and an expanded linear measurement range, is to be explained with reference to FIGS. 10A, B, C and FIG. 12.

Figure 10A:
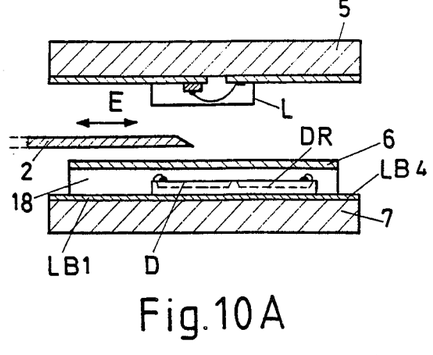
Figure 10B:
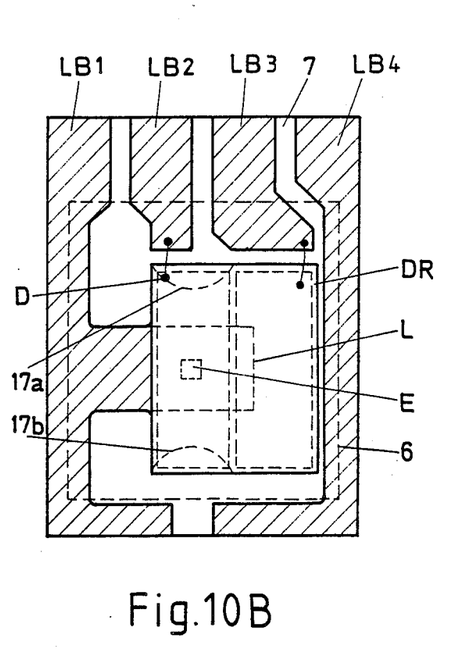

Such a miniaturized, optoelectronic displacement sensor, constructed in hybrid technology, is shown in side elevation in FIG. 10A. The radiation sensors in a form of photodiode D and reference photodiode DR in the form of a monolithically integrated silicon double photodiode (e.g. of the Siemens BPX 48 type) are bonded onto the ceramic receiver substrate 7 and are provided with a UV-hardenable, transparent covering 18.

The ceramic emitter substrate 5, which is situated opposite the receiver substrate 7, is equipped with an infrared-emitting light-emitting diode L, fitted in the same way, as light source.

The light-emitting diode L is regulated by a regulating electronic system (see block diagram, FIG. 12) in such a manner that the reference photodiode DR, which is at all times fully illuminated, emits a constant photocurrent (at constant temperature, this corresponds to a constant radiation power).

The diaphragm 2 disposed between the substrates 5, 7 shades off, in the operating region of the displacement sensor, only the photodiode D to a greater or lesser extent, so that the photodiode D receives a radiation power dependent upon the position of the diaphragm 2.

The monolithic integration of the two photodiodes D, DR ensures that the critical temperature progression of the photocurrent is absolutely identical for both diodes and can be compensated easily and accurately by means of the regulating electronic system connected to the reference photodiode DR.

The linearization of the dependence of the photocurrent upon the position of the diaphragm 2 is again achieved, in the arrangement according to FIG. 10A, by a correction filter 6, which, in the form of a foil, is directly cemented onto the covering 18 of the double photodiode (D, DR).

For the electrical connection of the light-emitting diode L and of the photodiodes D, DR, there are fitted on the substrates 5, 7 conductor strips (only the conductor strips LB1 and LB4 are designated in FIG. 10A) the arrangement of which becomes clear in the plan view of FIG. 10B.

FIG. 10B shows, in plan view, specifically the receiver substrate 7 with the conductor strips LB1 to LB4, and the double photodiode (D, DR), placed thereon, together with its connections. The light-emitting diode L with its emitter surface E, the correction filter 6 and specific correction segments 17a, b of the correction filter 6 are indicated, in their position, only by broken outline lines.

Of the conductor strips LB1 to LB4, the first conductor strip LB1 is guided, as cathode contact, under the substrate of the double photodiode (D, DR). The second and third conductor strip LB2 and LB3 respectively serve in each instance for the anode contacting of the photodiode D and reference photodiode DR respectively. The fourth conductor strip LB4 is, finally, exclusively provided as connection line for the light-emitting diode L (together with the conductor strip LB1, which represents the common ground connection for all three diodes).

The correction segments 17a, b of the correction filter 6, which have the shape of a segment of a circle, are optically opaque surfaces which are disposed in the region of the displacement of the diaphragm and which are intended to correct non-uniform light distribution in the direction of displacement of the diaphragm.

The actual form of the correction segments 17a, b depends upon the light distribution of the light-emitting diode L which is employed, and can be determined by a person skilled in the art, without difficulties, with reference to the diode characteristic. Various exemplary segment shapes and arrangements are reproduced in FIGS. 11A, B and C.

Figure 11A:
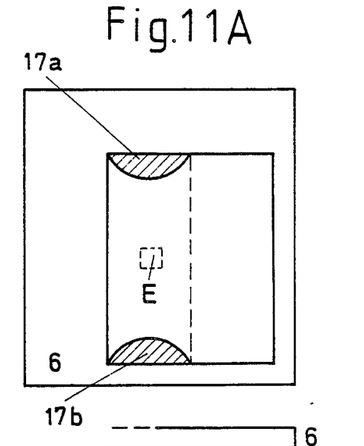
FIGS. 11A-C show various exemplary embodiments of a correction filter for a displacement sensor according to FIGS. 10A, B.
Figure 11B:
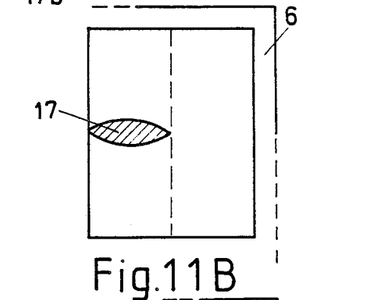
Figure 11C:
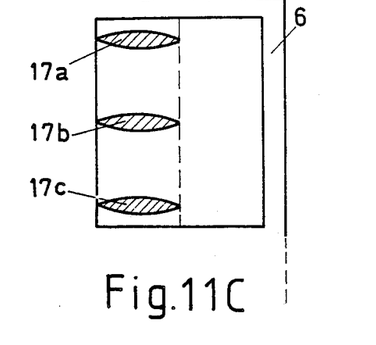

The correction filter 6 of FIG. 11A comprises the two correction segments 17a, b which are shown in FIG. 10B and which are disposed at the edge.

In the correction filter of FIG. 11B, the two correction segments on the edge side are combined into a correction segment 17 disposed in the center.

In the correction filter of FIG. 11C, the entire required correction surface is, on the other hand, divided up into three correction segments 17a, b, c, which are disposed in a distributed manner, of slimmer shape in each instance.

The correction filters 6 shown in FIGS. 11A, B, C can, for example, be cut 50 times larger as a mask and photographically reduced to the required dimensions. The correction foil obtained in this manner can then be cemented, by means of UV-hardenable adhesive, onto the covering 18 of the double photodiode. However, it is also feasible to apply the correction segments 17a, b, c directly as optically opaque aluminum metallization, to the photodiode chip (D, DR).

Figure 12:
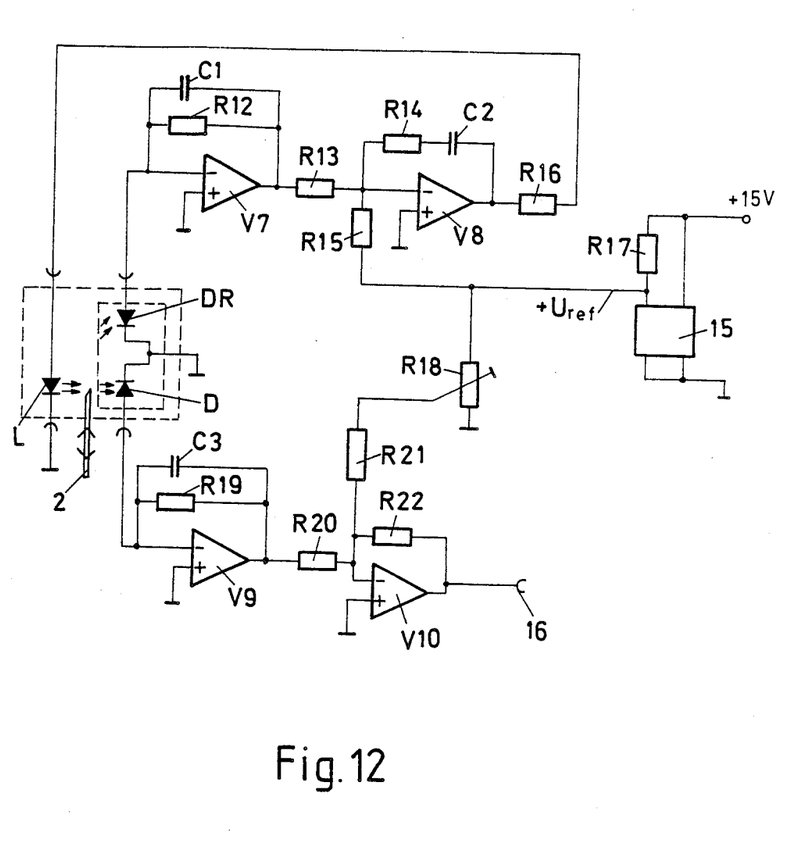
FIG. 12 shows the block circuit diagram of a tested evaluating electronic system with a regulating electronic system for a displacement sensor according to FIGS. 10A, B.

The block circuit diagram of an evaluating and regulating electronic system suitable for the displacement sensor according to FIGS. 10A, B is shown in FIG. 12:

The operational amplifiers V7, V8 with the resistors R12 to R16 and capacitors C1, 2 form, in a manner known per se, a PI regulator, which stabilizes the photocurrent of the light-emitting diode L.

The operational amplifier V9 together with the resistor R19 and the capacitor C3 operates as measurement amplifier for the photocurrent from the photodiode D. The asymmetric measurement signal present at its output is converted, in the following summation circuit (operational amplifier V10, resistors R20 . . . R22) into a zero-point-symmetrical position signal which can be taken off at the signal output 18. A highly stable reference element 15 (e.g. of the LM 399 type) delivers the compensating current required for this purpose (settable by means of the resistor R18). The reference voltage $U_{ref}$ of this reference element serves at the same time as a precise theoretical value for the regulating electronic system for the light-emitting diodes.

The embodiment shown in FIGS. 10A–12 exhibits, in particular, the following advantages:

- as a result of the use of a monolithically integrated double photodiode, an optimal temperature compensation is achieved,
- by minimizing the number of photodiodes, it is possible to construct the entire evaluating and regulating electronic system with a single 4-fold operational amplifier (e.g. of a LM 324 type),
- the linearization can be achieved in a particularly simple manner by application of the correction filter directly to the double photodiode.

Seen overall, it is therefore possible according to the invention to build a compact, simple, very sensitive and accurate displacement sensor, which can play an outstanding part specifically in the micrometer and submicrometer range, in the adjustment of optical waveguides.

We claim:

1. An optoelectronic displacement sensor for the absolute measurement of displacement in the submicrometer range, in particular for the positioning of optical waveguides, comprising:
    at least one light source having a certain intensity distribution;
    at least two flat, thermally coupled, optoelectronic radiation sensors disposed beside one another opposite said light source, each of said radiation sensors being at least partially illuminated by said light source and delivering an output signal in dependence of said illumination;
    an electronic measuring circuit connected to said radiation sensors and forming the difference of said output signals of said two radiation sensors;
    a diaphragm disposed between said light source and said radiation sensors, said diaphragm being displaceable parallel to said radiation sensors and being operable so that, in the case of a displacement of said diaphragm in one direction, the illuminated area of one of said radiation sensors is increased, while the illuminated area of the other of said radiation sensors is correspondingly reduced; and
    a correction filter having a transmissive filter area fixedly disposed between said light source and said radiation sensors, wherein the transmission of said correction filter varies over said filter area so that inhomogenities in said intensity distribution of said light source are specifically eliminated.

2. An optoelectronic displacement sensor as claimed in claim 1, wherein said correction filter is a film negative which has been exposed with said light source and has been developed after said exposure.

3. An optoelectronic displacement sensor as claimed in claim 2, wherein:
    said light source is an infrared light-emitting diode; and
    said radiation sensors are infrared-sensitive photodiodes.

4. An optoelectronic displacement sensors as claimed in claim 3, comprising:
    a housing in which said light-emitting diode is disposed, said housing having a planar glass window; and
    said correction filter cemented directly onto said glass window.

5. An optoelectronic displacement sensor as claimed in claim 1, wherein:
    said electronic measuring circuit comprises an operational amplifier in current-driven voltage source configuration for each of said radiation sensors; and
    the output signals of said operational amplifiers are fed to a differential amplifier circuit.

6. An optoelectronic displacement sensor for the absolute measurement of displacement in the submicrometer range, in particular for the positioning of optical waveguides, comprising:
    at least two light sources having a certain intensity distribution, said light sources being disposed one behind the other in a displacement direction;
    a pair of flat, thermally coupled, optoelectronic radiation sensors disposed opposite said light sources one behind the other in said displacement direction so that each of said light sources illuminates a corresponding of said radiation sensors and each of said radiation sensors delivers an output signal in dependence of said illumination;
    an electronic measuring circuit connected to said radiation sensors and forming the difference of said output signals of said two radiation sensors;
    a diaphragm disposed between said light sources and said radiation sensors, said diaphragm being displaceable in said displacement direction and being operable so that, in the case of a displacement of said diaphragm in one direction, the illuminated area of one of said radiation sensors is increased, while the illuminated area of the other of said radiation sensors is correspondingly reduced; and
    a correction filter having a transmissive filter area for each of said light sources, said correction filter being fixedly disposed between the respective of said light sources and said radiation sensors, and the transmission of said correction filter varying over said filter area so that inhomogenities in said intensity distribution of said light sources are specifically eliminated.

7. An optoelectronic displacement sensor as claimed in claim 6, wherein:
    said light sources are infrared light-emitting diodes;
    said radiation sensors are infrared-sensitive photodiodes;
    said light-emitting diodes are each accommodated in a housing with a planar glass window; and
    said correction filter is cemented directly onto said glass window of said diode housing of the respective of said light-emitting diodes.

8. An optoelectronic displacement sensor for the absolute measurement of displacement in the submicrometer range, in particular for the positioning of optical waveguides, comprising:
    a light source having a certain intensity distribution;

a monolithically integrated double photodiode with two photodiodes disposed opposite said light source beside one another, each of said photo diodes being illuminated at least partially by said light source and delivering an output signal in dependence of said illumination, one of said photodiodes thereby acting as a reference photodiode, and the other of said photodiodes acting as a measuring photodiode;

an electronic measuring circuit connected to said photodiodes, comprising a regulating circuit to which said output signal of said reference photodiode is fed, and which supplies a regulated current through said light source;

a diaphragm disposed between said light source and said photodiodes, said diaphragm being displaceable parallel to said photodiodes and being designed so that, in the case of a displacement of said diaphragm in one direction, only the illuminated area of said measuring photodiode is varied; and a correction filter having a transmissive filter area, said correction filter being fixedly disposed between said light source and said measuring photodiode, and the transmission of said correctiion filter varying over said filter area so that inhomogenities in said intensity distribution of said light source are specifically eliminated.

9. An optoelectronic displacement sensor as claimed in claim 8, wherein said light source is an infrared light-emitting diode;

said double photodiode is an infrared-sensitive double photodiode; and said correction filter is disposed on the surface of said double photodiode.

10. An optoelectronic displacement sensor for the absolute measurement of displacement in the submicrometer range, in particular for the positioning of optical waveguides, comprising:

at least two light sources having a certain intensity distribution, said light sources being disposed one behind the other in a displacement direction;

a pair of flat thermally coupled, optoelectronic radiation sensors disposed opposite said light source one behind the other in said displacement direction so that each of said light sources illuminates a corresponding of said radiation sensors and each of said radiation sensors delivers an output signal in dependence of said illumination;

an electronic measuring circuit connected to said radiation sensors and forming the difference of said output signals of said two radiation sensors;

a diaphragm disposed between said light sources and said radiation sensors, said diaphragm being displaceable in said displacement direction, and said diaphragm being operable so that, in the case of a displacement of said diaphragm in one direction, the illuminated area of one of said radiation sensors is increased, while the illuminated area of the other of said radiation sensors is correspondingly reduced;

besides each one of said radiation sensors a reference sensor which is fully illuminated by the respective one of said light sources in each position of said diaphragm;

a regulating circuit connected to each of said reference sensors and delivering a regulated current through the respective of said light sources; and a correction filter having transmissive filter areas for respective of said light sources, said correction filter being fixedly disposed between the respective of said light sources and said radiation sensors, and the transmission of said correction filter varying over said filter areas so that inhomogenities in said intensity distribution of said light sources are specifically eliminated.

11. An optoelectronic displacement sensor as claimed in claim 10, wherein said light sources are infrared light-emitting diodes; and said radiation sensors and said reference sensors are infrared-sensitive photodiodes.

* * * * *